(12) United States Patent
Batta et al.

(10) Patent No.: US 10,803,123 B2
(45) Date of Patent: Oct. 13, 2020

(54) AUTOMATIC GENERATION OF VARIATIONS OF SEARCH CRITERIA FOR USE IN A PREDICTIVE SEARCH ENGINE

(71) Applicant: Verizon Patent and Licensing Inc., Basking Ridge, NJ (US)

(72) Inventors: Andrew Batta, Broomfield, CO (US); Jonathan Harahush, Golden, CO (US); Chad Kearney, Denver, CO (US); Carolyn Vlach, Aurora, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 363 days.

(21) Appl. No.: 15/881,483

(22) Filed: Jan. 26, 2018

(65) Prior Publication Data
US 2019/0236216 A1    Aug. 1, 2019

(51) Int. Cl.
*G06F 16/9032*   (2019.01)
*G06F 16/9535*   (2019.01)

(52) U.S. Cl.
CPC .. *G06F 16/90328* (2019.01); *G06F 16/90332* (2019.01); *G06F 16/9535* (2019.01)

(58) Field of Classification Search
CPC ................ G06F 16/90324; G06F 16/90328
See application file for complete search history.

(56) References Cited

U.S. PATENT DOCUMENTS

| | | | |
|---|---|---|---|
| 10,134,388 B1* | 11/2018 | Lilly | G06F 40/268 |
| 2009/0043741 A1* | 2/2009 | Kim | G06F 16/3322 |
| 2015/0242898 A1* | 8/2015 | Gupta | G06F 16/9537 |
| | | | 705/14.54 |
| 2019/0140995 A1* | 5/2019 | Roller | G06F 40/30 |
| 2019/0178671 A1* | 6/2019 | DeLuca | G01C 21/3608 |

* cited by examiner

*Primary Examiner* — Kris E Mackes

(57) ABSTRACT

A device can obtain location information that includes a set of location name values associated with a set of locations. The device can identify, using a natural language processing model, a set of proper noun values associated with the set of location name values. The device can generate a set of search criteria variant terms for the set of proper noun values. The set of search criteria variant terms can each include one or more characters associated with an alias of a particular proper noun value. The device can receive, from a user device, partial search criteria relating to an alias of a destination location. The device can process the partial search criteria using the set of search criteria variant terms to identify a set of candidate search terms. The device can provide the set of candidate search terms to the user device.

20 Claims, 6 Drawing Sheets

| Generation Methods | Example |
|---|---|
| • Determine alias<br>• Generate search criteria variant terms of alias<br>• Configurable Templates<br>  • Common Alias Type Rule<br>  • Language-Based Rule<br>  • Location-Based Rule | • Name: John F. Kennedy Center<br>• Common Nickname: Kennedy Center<br>• Existing Search Criteria Terms:<br>  • J, Jo, Joh, John, John F., John F. K, John F. Ke, ... John F. Kennedy Center<br>• Search Criteria Variant Terms:<br>  • K, Ke, Ken, Kenn,...Kennedy Center<br>  • John, F., Kennedy, Center<br>  • Washington DC, Kennedy, Center |

115
Generate search criteria variant terms for proper noun values

Predictive Search Platform

FIG. 1B

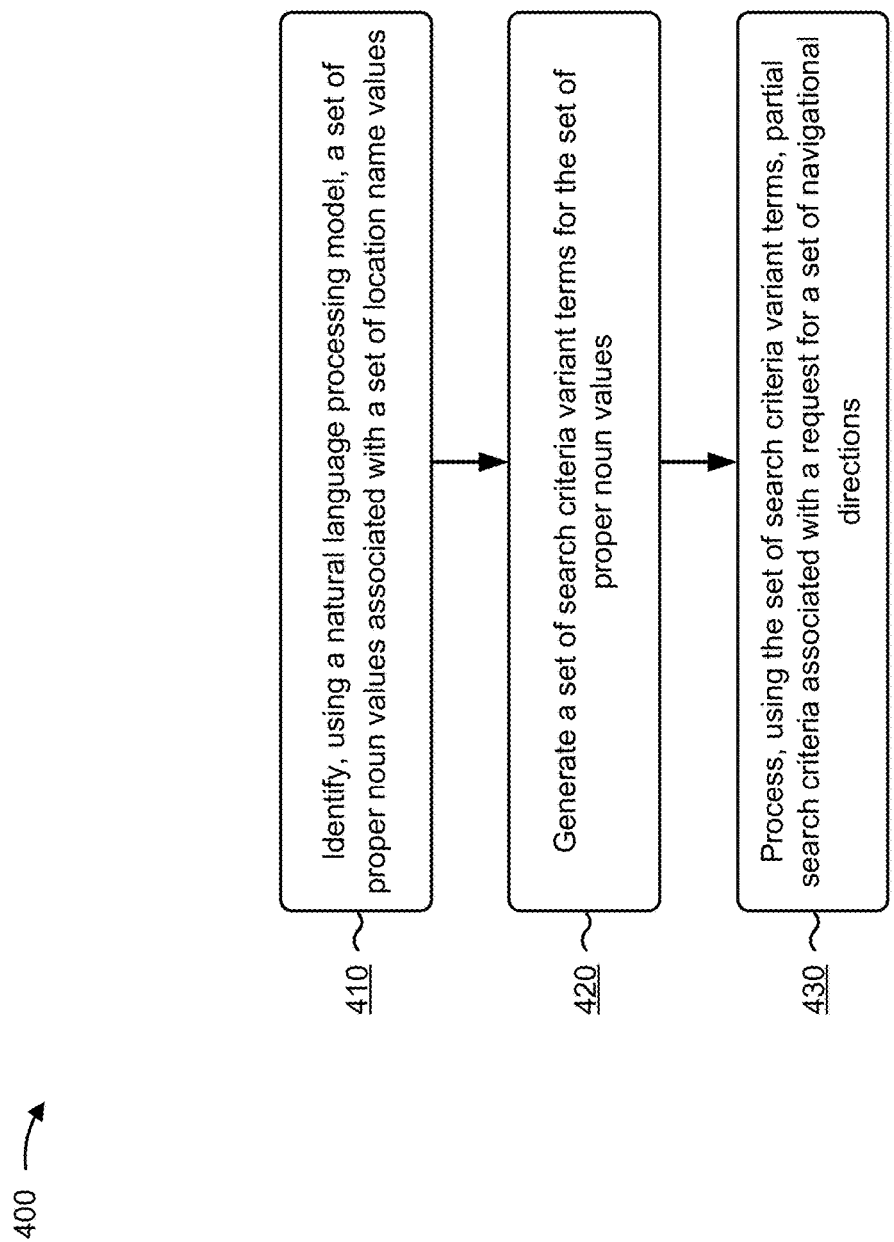

AUTOMATIC GENERATION OF VARIATIONS OF SEARCH CRITERIA FOR USE IN A PREDICTIVE SEARCH ENGINE

BACKGROUND

A predictive search engine can be used to match a portion of a user's search criteria (referred to herein as partial search criteria) with relevant search results. For example, a user can input partial search criteria, and a predictive search engine can process the partial search criteria to generate relevant search results.

BRIEF DESCRIPTION OF THE DRAWINGS

FIGS. 1A-1C are diagrams of an overview of an example implementation described herein;

FIG. 4 is a flow chart of an example process for generating a set of search criteria variant terms for a set of proper noun values.

DETAILED DESCRIPTION OF PREFERRED EMBODIMENTS

Figure 1A:
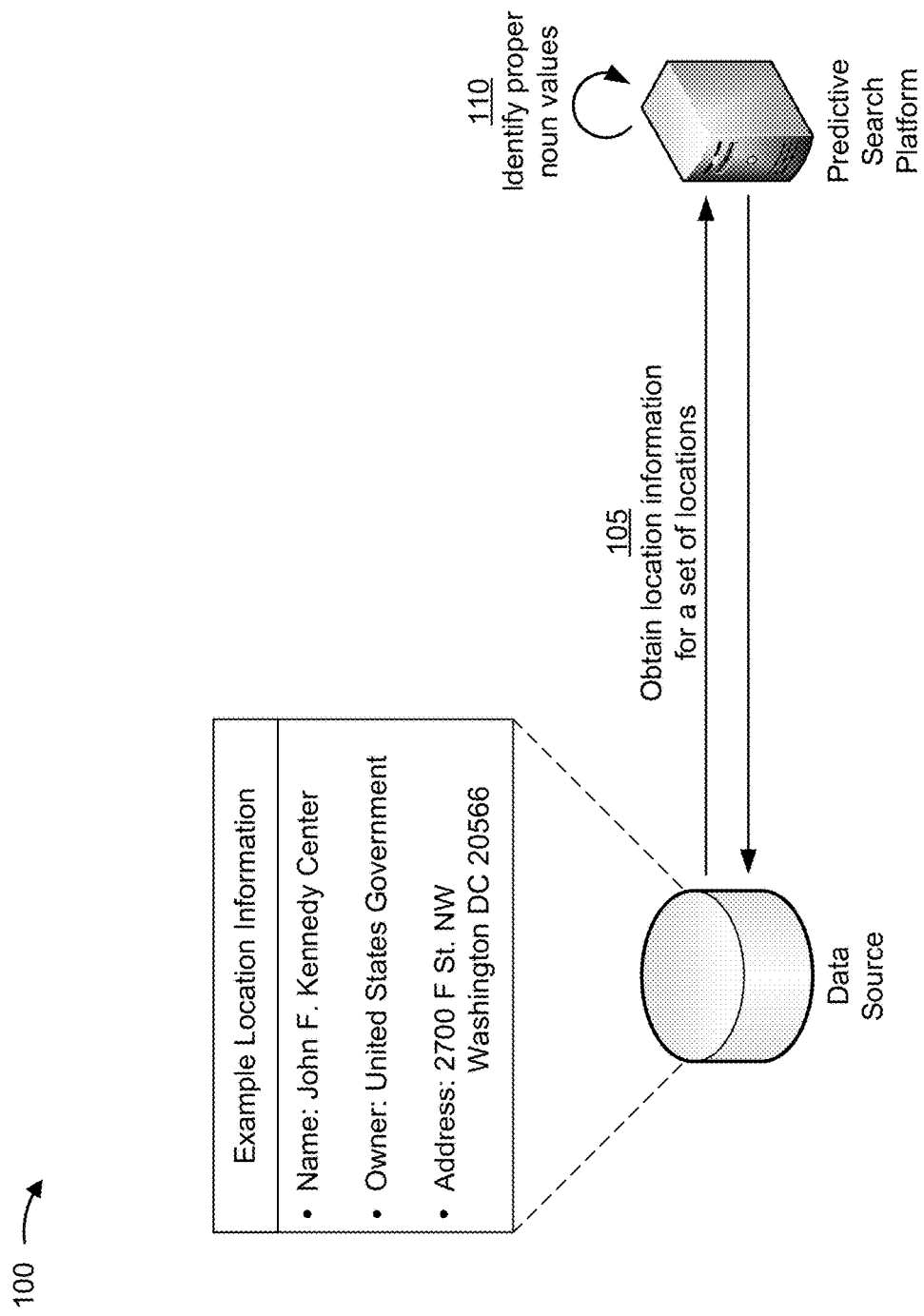

The following detailed description of example implementations refers to the accompanying drawings. The same reference numbers in different drawings can identify the same or similar elements.

A predictive search engine can be used to match partial search criteria with relevant search results. For example, if a user needs to be directed toward a destination, the user can interact with a device and input partial search criteria for the destination, such as a name of the destination, a city of the destination coupled with the name of the destination, and/or the like. As the user inputs partial search criteria (e.g., a portion of the name of the destination), the predictive search engine can process the partial search criteria to generate candidate search terms which can be provided to the device for display on a user interface, thereby allowing the user to select one of the candidate search terms as the complete search criteria to use to request the navigational directions to the destination.

To optimize a predictive search engine to yield results as quickly as possible, the predictive search engine can perform a character-by-character search. For example, the predictive search engine can perform a character-by-character search that compares each character input by the user with a set of characters stored via a data structure. As an example, if a user is searching for The White House, the user can input partial search criteria, such as The Wh, at which time the predictive search engine can compare the character string The Wh to one or more character strings stored via the data structure. If the data structure stores the character string The White House, then the character string The White House (along with any other matching character strings) will be displayed on a user interface as a candidate search term that can be selectable as complete search criteria.

However, in some situations, such as when a user is seeking navigational directions to a destination that is commonly known by an alias that uses different characters than a full name of the destination, the predictive search engine can fail to generate candidate search terms within a desired time period (e.g., before a user completes manually typing out the destination name).

As an example, assume a user is searching for the John F. Kennedy Center, which has a commonly known alias of the Kennedy Center. In this case, because the John F. Kennedy Center is commonly known as the Kennedy Center, the user can input partial search criteria, such as a Kenne, which can cause the predictive search engine to compare the character string Kenne to one or more character strings stored via the data structure. However, because the data structure stores character strings relating to the full name of the destination (e.g., character strings beginning with John), the predictive search engine can fail to generate candidate search terms that identify the destination as the John F. Kennedy Center.

Some implementations described herein provide a predictive search platform to perform a predictive search using a set of search criteria variant terms. For example, the predictive search platform can obtain location information associated with a set of locations. The location information can include a set of location name values for the set of locations. In this case, the predictive search platform can use a natural language processing model to identify a set of proper noun values associated with the set of location name values.

Additionally, the predictive search platform can generate a set of search criteria variant terms for the set of proper noun values. The set of search criteria variant terms can each include one or more characters associated with an alias of a particular proper noun value of the set of proper nouns values. Furthermore, the predictive search platform can receive, from a user device, partial search criteria relating to a particular alias of a destination. In this case, the predictive search platform can process the partial search criteria using the set of search criteria variant terms to identify a set of candidate search terms. Moreover, the predictive search platform can provide the set of candidate search terms for display on an interface of the user device.

In this way, the predictive search platform is able to use search criteria variant terms to satisfy requests where a user inputs an alias of a location name. Furthermore, the predictive search platform conserves processing resources relative to an inferior platform that is unable to identify exact matches with partial search terms that include aliases of locations, conserves processing resources that might otherwise be used to identify undesired candidate search terms (i.e., candidate search terms a user is unlikely to select), conserves processing resources and/or memory resources by using configurable templates to identify and store optimal search criteria variant terms (e.g., relative to identifying and storing search criteria variant terms for all possible variations of location names), and/or the like.

Figure 1C:
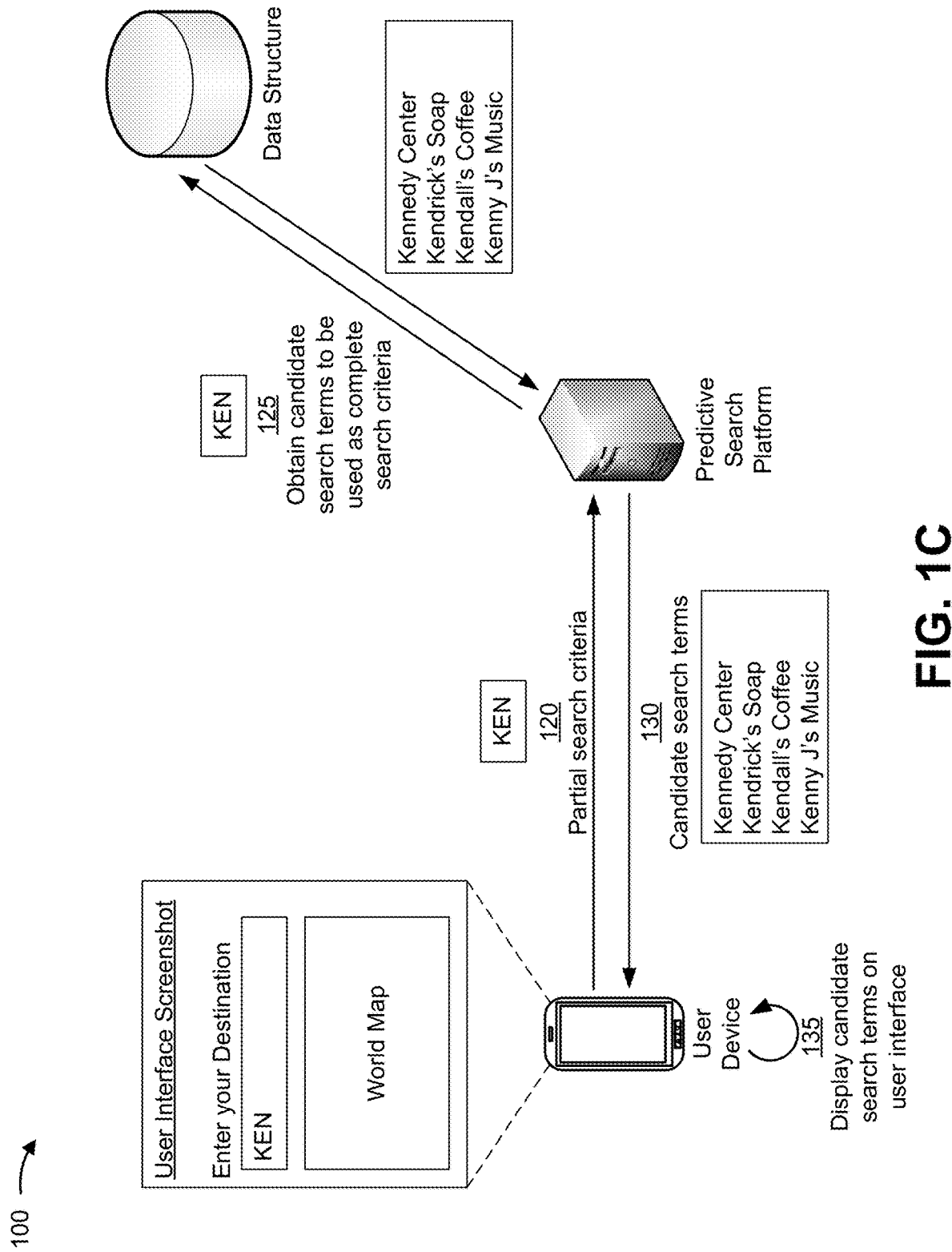

FIGS. 1A-1C are diagrams of an overview of an example implementation 100 described herein. As shown in FIGS. 1A-1C, example implementation 100 includes a predictive search platform that generates search criteria variant terms for a set of location name values that include proper nouns, where the search criteria variant terms include characters associated with commonly known aliases of the proper nouns.

As shown in FIG. 1A, and by reference number 105, the predictive search platform can obtain location information for a set of locations from a data source. The location information can include a set of location name values for the set of locations. For example, the data source can store location information for millions, even billions of locations, and the predictive search platform can search (e.g., query)

the data source to obtain the location information. As shown as an example, the location information for the John F. Kennedy Center can include a location name value of John F. Kennedy Center, and additional information relating to the location (e.g., an owner, an address, etc.).

As shown by reference number 110, the predictive search platform can identify a set of proper noun values included in the set of location name values. For example, the predictive search platform can use a language processing model to perform a named-entity recognition (NER) technique on the location information to identify the location name values that include proper noun values. Continuing with the particular example shown, the predictive search platform can identify John F. Kennedy as a proper noun included in the location name John F. Kennedy Center.

In this way, the predictive search platform is able to identify proper noun values associated with the set of location name values.

As shown in FIG. 1B, and by reference number 115, the predictive search platform can generate a set of search criteria variant terms for the set of proper noun values. For example, the predictive search platform can generate the set of search criteria variant terms that each include one or more characters associated with an alias of a particular proper noun value of the set of proper noun values.

In this case, the predictive search platform can determine a particular alias for a proper noun value by analyzing historical search information (e.g., historical records of actual searches made by users). For example, if the historical search information for a particular location includes a threshold number of searches for a particular character string that is different than the location name, the predictive search platform can identify the particular character string as an alias, and can generate one or more search criteria variant terms for the alias.

As shown as an example, the predictive search platform can generate search criteria variant terms for the John F. Kennedy Center. In this example, a data structure can store existing search criteria variant terms, such as J, Jo, Joh, John, John F., John F. K, John F. Ke, . . . John F. Kennedy Center. In this case, the predictive search platform can determine that Kennedy Center is an alias for the John F. Kennedy Center. Additionally, the predictive search platform can generate search criteria variant terms for the alias, such as K, Ke, Ken, Kenn, . . . , Kennedy Center, and/or the like. Furthermore, the predictive search platform can store the search criteria variant terms using the data structure.

In some cases, the predictive platform can generate a configurable template that is to be used to generate one or more search criteria variant terms. For example, the predictive search platform can generate a configurable template to identify proper nouns that share a common type of alias (e.g., it might be common for a High School with a proper name to have an alias of the last name, such as Thomas A. Edison High School being referred to as Edison High School), a configurable template that includes a language-specific naming convention, a configurable template to identify a geographic area associated with one or more proper noun values, and/or the like, as each described further herein.

In this way, the predictive search platform is able to generate a set of search criteria variant terms for the set of proper noun values.

As shown in FIG. 1C, and by reference number 120, the predictive search platform can receive partial search criteria from a user device. For example, a user can interact with the user device to begin to input Kennedy Center as part of a request for a set of navigational directions to the Kennedy Center. Shown as an example, the partial search criteria can be a character string Ken, and the character string Ken can be provided to the predictive search platform.

As shown by reference number 125, the predictive search platform can obtain a set of candidate search terms from the data structure. For example, the predictive search platform can query the data structure to obtain candidate search terms such as Kennedy Center, Kendrick's Soap, Kendall's Coffee, Kenny J's Music, and/or the like.

As shown by reference number 130, the predictive search platform can provide the candidate search terms to the user device. As shown by reference number 135, the user device can display the candidate search terms via the user interface. In this way, even though the user has begun to input an alias for the destination, the predictive search platform is still able to identify and provide a candidate search term that identifies the destination.

In this way, the predictive search platform is able to use search criteria variant terms to satisfy requests where a user inputs an alias of a location name. Furthermore, by using search criteria variant terms for variations of different location name aliases, the predictive search platform conserves processing resources that might otherwise be used to identify undesired candidate search terms.

As indicated above, FIGS. 1A-1C are provided merely as an example. Other examples are possible and can differ from what was described with regard to FIGS. 1A-1C. For example, there can be additional devices and/or networks, fewer devices and/or networks, different devices and/or networks, or differently arranged devices and/or networks than those shown in FIGS. 1A-1C. Furthermore, two or more devices shown in FIGS. 1A-1C can be implemented within a single device, or a single device shown in FIGS. 1A-1C can be implemented as multiple, distributed devices. Additionally, or alternatively, a set of devices (e.g., one or more devices) of example implementation 100 can perform one or more functions described as being performed by another set of devices of example implementation 100.

Figure 2:
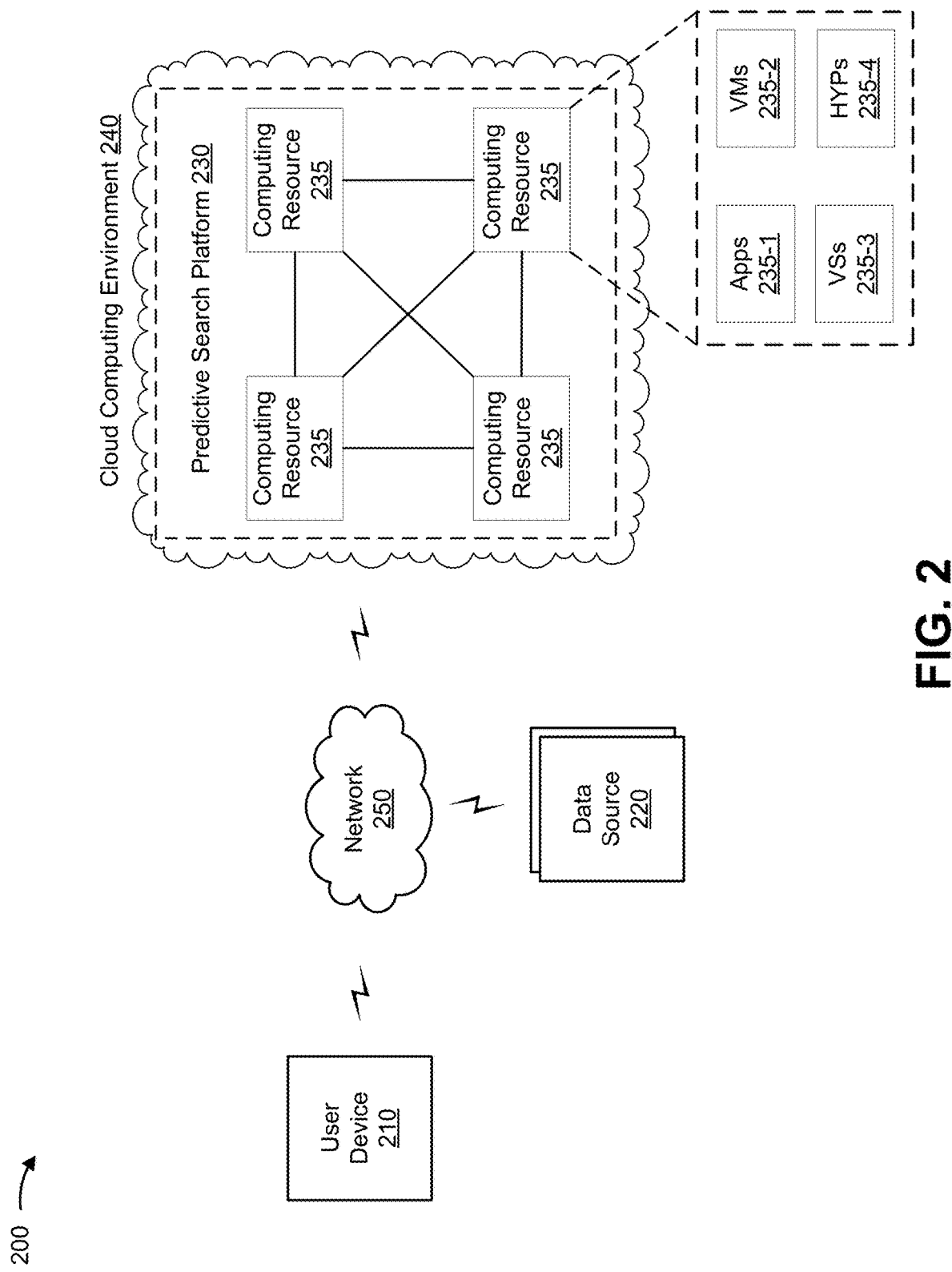
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, example environment 200 can include a user device 210, a data source 220, a predictive search platform 230 hosted by a cloud computing environment 240, and/or a network 250. Devices of example environment 200 can interconnect via wired connections, wireless connections, or a combination of connections.

User device 210 includes one or more devices capable of receiving, generating, storing, processing, and/or providing information associated with a request for navigational directions. For example, user device 210 can include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), a global positioning system (GPS) device, an electronic control unit (ECU) of a vehicle, an engine control module (ECM) of a vehicle, or a similar type of device. In some implementations, user device 210 can provide a request for a set of navigational directions to predictive search platform 230. In some implementations, user device 210 can receive, from predictive search platform 230, candidate search terms that can be displayed via an interface.

Data source 220 includes one or more devices capable of receiving, storing, processing, and/or providing information associated with a set of locations. For example, data source 220 can include a server device or a group of server devices. In some implementations, data source 220 can receive, as part of a search (e.g., query) from predictive search platform 230, a request for location information for a set of locations. In some implementations, data source 220 can provide the location information to predictive search platform 230.

Predictive search platform 230 includes one or more devices capable of receiving, storing, generating, processing, and/or providing information associated with location information for a set of locations. For example, predictive search platform 230 can include a server device (e.g., a host server, a web server, an application server, etc.), a data center device, or a similar device.

In some implementations, as shown, predictive search platform 230 can be hosted in cloud computing environment 240. Notably, while implementations described herein describe predictive search platform 230 as being hosted in cloud computing environment 240, in some implementations, predictive search platform 230 might not be cloud-based (i.e., can be implemented outside of a cloud computing environment) or might be partially cloud-based.

Cloud computing environment 240 includes an environment that hosts predictive search platform 230. Cloud computing environment 240 can provide computation, software, data access, storage, and/or other services that do not require end-user knowledge of a physical location and configuration of system(s) and/or device(s) that host predictive search platform 230. As shown, cloud computing environment 240 can include a group of computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 can host predictive search platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that can be provided to or accessed by user device 210. Application 235-1 can eliminate a need to install and execute the software applications on user device 210. For example, application 235-1 can include software associated with predictive search platform 230 and/or any other software capable of being provided via cloud computing environment 240. In some implementations, one application 235-1 can send/receive information to/from one or more other applications 235-1, via virtual machine 235-2.

Virtual machine 235-2 includes a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of a user (e.g., user device 210), and can manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of example environment 200 can perform one or more functions described as being performed by another set of devices of example environment 200.

Figure 3:
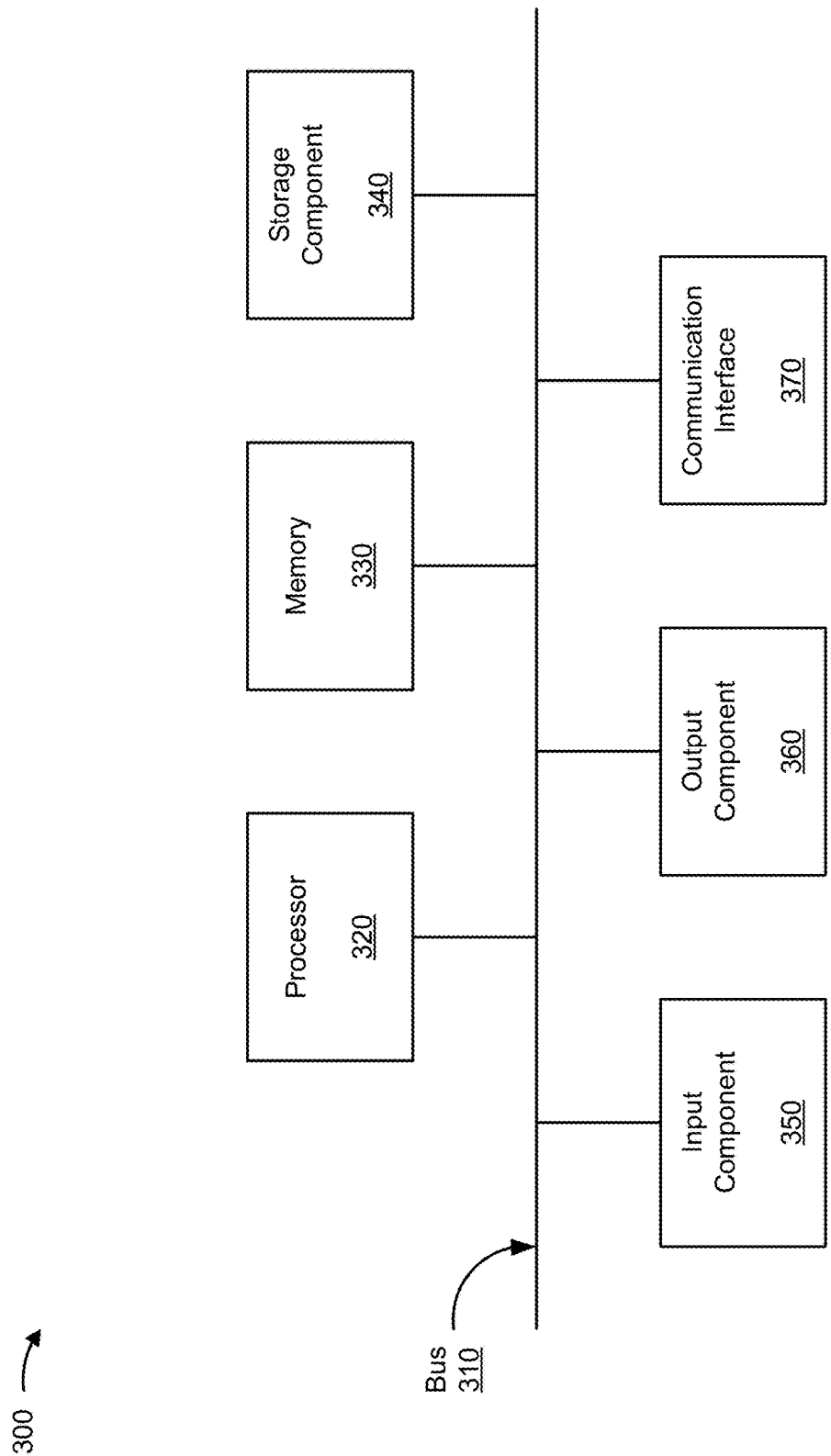
FIG. 3 is a diagram of example components of one or more devices of FIG. 2.

FIG. 3 is a diagram of example components of a device 300. Device 300 can correspond to user device 210, data source 220, and/or predictive search platform 230. In some implementations, user device 210, data source 220, and/or predictive search platform 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in location of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for generating a set of search criteria variant terms for a set of proper noun values. In some implementations, one or more process blocks of FIG. 4 can be performed by predictive search platform 230. In some implementations, one or more process blocks of FIG. 4 can be performed by another device or a group of devices separate from or including predictive search platform 230, such as user device 210 and/or data source 220.

As shown in FIG. 4, process 400 can include identifying, using a natural language processing model, a set of proper noun values associated with a set of location name values (block 410). For example, predictive search platform 230 (e.g., computing resource 225, processor 320, memory 330, storage component 340, etc.) can obtain location information for a set of locations, where the location information includes a set of location name values identifying names of each location. In this case, predictive search platform 230 can process the location information using a natural language processing model to identify a set of proper noun values that are included in the set of location name values for the set of locations.

In some implementations, predictive search platform 230 can obtain location information for a set of locations. For example, predictive search platform 230 can search (e.g., query) data source 220 to obtain location information for the set of locations. In some implementations, location information for a particular place can include a location name value and/or additional information relating to the location, such as an address value, an ownership value, a value describing the particular place (e.g., as an airport, a school, a stadium, etc.), and/or the like. Additionally, or alternatively, data source 220 can be configured to automatically provide location information to predictive search platform 230 (e.g., in bulk, periodically over an interval, etc.).

In some implementations, predictive search platform 230 can standardize the location information. For example, predictive search platform 230 can obtain location information associated with different data types, data formats, and/or the like, and can standardize the location information to a uniform data type, data format, and/or the like. In some implementations, predictive search platform 230 can apply different standardization techniques for different data types or data formats. As an example, predictive search platform 230 can standardize the information to a text format, such that the predictive search platform 230 is able to apply further analysis to the text. By using an appropriate standardization technique for a particular data type or data format, predictive search platform 230 conserves processing resources relative to using an inappropriate standardization technique.

In some implementations, predictive search platform 230 can identify a set of proper noun values. For example, predictive search platform 230 can identify a set of proper noun values using a natural language processing model that has been trained to perform named-entity recognition (NER). In this case, predictive search platform 230 can provide the location information as input to the natural language processing model to cause the model to identify the set of proper noun values.

In some cases, predictive search platform 230 can use a natural language processing model that is provided by a third party. For example, predictive search platform 230 can, using an application programming interface (API), provide the location information as input to a natural language processing model that is being supported by a third party server device, which can cause the natural language processing model to output the set of proper noun values. In this case, the server device can provide the proper noun values to predictive search platform 230. In other cases, predictive search platform 230 can train a natural language processing model on historical location information, and can use the trained natural language processing model to identify the set of proper noun values.

In this way, predictive search platform 230 is able to identify a set of proper noun values.

As shown in FIG. 4, process 400 can include generating a set of search criteria variant terms for the set of proper noun values (block 420). For example, predictive search platform 230 (e.g., computing resource 225, processor 320, memory 330, storage component 340, etc.) can generate a set of search criteria variant terms that each include one or more characters associated with an alias of a particular proper noun value of the set of proper noun values.

A search criteria variant term can be one or more characters, words, phrases, and/or the like, that are logically separated to predict partial search criteria that might be input by a user into a search engine. For example, a search criteria variant term can be one or more characters identifying a proper name included in a location name (or a subset of the proper name, such as a first name, a middle initial or middle name, a last name, characters within the first name, the middle name, the last name, etc.), one or more characters associated with an alias of a location (e.g., one or more characters of a nickname that is different than the first name, the last name, and/or the middle name or initial), one or more characters associated with a geographic area near the location, one or more characters associated with a common misspelling of a location name or alias or geographic area, and/or the like.

In some implementations, predictive search platform 230 can determine a particular alias for a proper noun value. For example, predictive search platform 230 can determine a particular alias for a proper noun value by analyzing historical search information. Historical search information can include records of actual searches made by users. In this case, predictive search platform 230 can analyze the historical search information to determine that, for a particular location, a threshold number (or a threshold percentage) of searches include a particular character string that is different than the location name. As such, predictive search platform 230 can identify the particular character string as an alias, and can generate one or more search criteria variant terms for the alias.

As an example, assume that throughout a particular time period that one million searches are made for the John F. Kennedy Center. Further assume that of the one million searches, that five hundred thousand of the searches involved the user inputting Kennedy Center (as opposed to John F. Kennedy Center). In this example, predictive search platform 230 can compare the five hundred thousand searches to a threshold value to determine that the value Kennedy Center is an alias for the John F. Kennedy Center. In other cases, a human can provide the alias to predictive search platform 230.

In some implementations, predictive search platform 230 can generate one or more search criteria variant terms. For example, predictive search platform 230 can determine an alias for a particular location, as described above, and can generate one or more search criteria variant terms associated with the alias. As an example, predictive search platform 230 can generate search criteria variant terms for the John F. Kennedy Center, as described above (see, e.g., discussion in FIG. 1B).

Additionally, or alternatively, predictive search platform 230 can generate a configurable template that is to be used to generate one or more search criteria variant terms. For example, predictive search platform 230 can generate a configurable template to identify a group of proper nouns that share a common type of alias, a configurable template that includes a language-specific naming convention, a configurable template to identify a geographic area associated with one or more proper noun values, and/or the like.

As an example, predictive search platform 230 can generate one or more search criteria variant terms using a configurable template that identifies proper nouns that share a common type of alias. In this example, predictive search platform 230 can process historical location information (e.g., using a machine learning model) to identify a trend associated with a particular type of location. As an example, a trend might indicate that a threshold amount of High School names that includes proper names use the last name of the proper name as an alias. As an example, Thomas A. Edison High School might be commonly known as Edison High School, Edison High, Edison School, or even simply Edison. Here, predictive search platform 230 can apply the configurable template to location name values for each High School to generate search criteria variant terms for the last names of each High school name. In this way, predictive search platform 230 conserves processing resources relative to generating search criteria variant terms for all possible combinations of aliases.

As another example, predictive search platform 230 can generate one or more search criteria variant terms using a configurable template that includes a language-specific naming convention. For example, words or phrases might be arranged in a particular order in a first language (e.g., relative to a second language that has a different naming convention). In this case, predictive search platform 230 can generate a configurable template that includes instructions to generate search criteria variant terms based on the language-specific naming convention. As a particular example, a first language might have a naming convention where a user will write a city name before a location name, whereas a second language might have a naming convention where a user will write a location name before a city name. As such, predictive search platform 230 can use the configurable template to generate a first set of search criteria variant terms for the first language and a second set of search criteria variant terms for the second language, such that a language used by a user inputting a request can dictate which set of search criteria variant terms are queried.

As another example, predictive search platform 230 can generate one or more search criteria variant terms using a configurable template that identifies a geographic area associated with one or more proper noun values. In this example, the configurable template can include instructions to generate search criteria variant terms that begin with a geographic area (e.g., a city or state) and that end with a location name or an alias of the location name, or that begin with a location name or an alias of the location name and that end with the geographic area. As a particular example, a data structure might store the location name value John F. Kennedy Center, which can have a location value of Washington D.C. and an alias of Kennedy Center. In this example, predictive search platform 230 can apply the configurable template to generate search criteria variant terms that begin with the geographic area and that end with the location name or the alias (e.g., W, Wa, Was, . . . , Washington D.C. Kennedy Center).

In some implementations, predictive search platform 230 can store the set of search criteria variant terms using a data structure. For example, predictive search platform 230 can store the set of search criteria variant terms using an array, a linked-list, a table, a tree, a graph, and/or the like. In some cases, predictive search platform 230 can add the set of search criteria variant terms to an existing data structure that stores search criteria terms, such that the data structure can store both the pre-existing search criteria terms and the search criteria variant terms.

In this way, predictive search platform 230 is able to generate a set of search criteria variant terms.

As shown in FIG. 4, process 400 can include processing, using the set of search criteria variant terms, partial search criteria associated with a request for a set of navigational directions (block 430). For example, predictive search platform 230 (e.g., computing resource 225, processor 320, memory 330, storage component 340, communication interface 370, etc.) can receive, from user device 210, partial search criteria relating to a particular alias of a destination location. In this case, predictive search platform 230 can use the set of search criteria variant terms to process the partial search criteria and identify a set of candidate search terms. Furthermore, predictive search platform 230 can provide the set of candidate search terms for display on a user interface of user device 210.

In some implementations, predictive search platform 230 can receive partial search criteria. For example, a user can interact with user device 210 to input partial search criteria via a user interface, and user device 210 can provide the partial search criteria to predictive search platform 230.

In some implementations, predictive search platform 230 can use the set of search criteria variant terms to process the request. For example, predictive search platform 230 can use the partial search criteria to search (e.g., query) the data structure that stores the set of search criteria variant terms. In this case, a result of the search can return candidate search terms that match with the partial search criteria.

In some implementations, predictive search platform 230 can provide the candidate search terms to user device 210. For example, predictive search platform 230 can provide the candidate search terms for display on the user interface of user device 210. In this way, a user can view the candidate search terms on the user interface, and can select a candidate search term that identifies a desired destination.

In some implementations, predictive search platform 230 can modify the set of search criteria variant terms based on feedback information. For example, predictive search platform 230 can receive feedback information that identifies whether each user selected one of the candidate search terms. In this case, predictive search platform 230 can analyze the feedback information to identify searches that were unsuccessful (e.g., where a user did not select one of the candidate search terms and continued to manually type out the destination location), and can modify the set of search criteria variant terms to improve accuracy of the predictive search engine. As an example, predictive search platform 230 can identify the partial search term and/or the completed search term input by a particular user in an unsuccessful search, and can generate search criteria variant terms of the partial search term or of the completed search term.

Additionally, or alternatively, predictive search platform 230 can remove search criteria variant terms. For example, if, after a threshold time period, certain search criteria variant terms are never used, predictive search platform 230 can remove the search criteria variant terms from the data structure, thereby conserving memory resources.

Additionally, or alternatively, predictive search platform 230 can automatically generate the set of navigational directions. For example, predictive search platform 230 can determine whether a candidate search term is likely to be a term desired by user device 210 (e.g., based on a geographic location of user device 210, based on historical searches made by user device 210, based on recent search trends of all users or a group of users in a similar geographic area, etc.). In this case, predictive search platform 230 can automatically generate the set of navigational directions to the destination associated with the candidate search term that is likely to be the term desired by user device 210 (e.g., without a user having to manually make a selection on a user interface). In some cases, predictive search platform 230 can reduce a number of candidate search terms by identifying a subset of candidate search terms that are likely to include a term desired by user device 210. In some cases, predictive search platform 230 can make a determination using a threshold. As an example, if a user is within a threshold geographic area of a first candidate search term but not within the threshold geographic area of the remaining candidate search terms, predictive search platform 230 can automatically generate the set of navigational directions to a destination identified by the first candidate search term.

In this way, predictive search platform 230 is able to use the set of search criteria variant terms to identify candidate search terms needed to satisfy requests for navigational directions.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, predictive search platform 230 is able to use search criteria variant terms to satisfy requests where a user inputs an alias of a location name. Furthermore, predictive search platform 230 conserves processing resources relative to an inferior platform that is unable to identify exact matches with partial search terms that include aliases of locations, conserves processing resources that might otherwise be used to identify undesired candidate search terms (i.e., candidate search terms a user is unlikely to select), conserves processing resources and/or memory resources by using configurable templates to identify and store optimal search criteria variant terms (e.g., relative to identifying and storing search criteria variant terms for all possible variations of location names), and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 one or more memories; and
 one or more processors, communicatively coupled to the one or more memories, to:
  obtain location information associated with a set of locations,
   the location information including a set of location name values for the set of locations;
  identify, using a natural language processing model, a set of proper noun values associated with the set of location name values;
  generate a set of search criteria variant terms for the set of proper noun values,
   the set of search criteria variant terms each including one or more characters associated with an alias of a particular proper noun value of the set of proper noun values, and
   where the one or more processors, when generating the set of search criteria variant terms, are to:
    generate, for one or more proper noun values of the set of proper noun values, a configurable template used to generate one or more search criteria variant terms of the set of search criteria variant terms,
     the configurable template to identify a geographic area associated with the one or more proper noun values, and
    generate the one or more search criteria variant terms using the configurable template;
  receive, from a user device, partial search criteria relating to an alias of a destination location;
  process the partial search criteria using the set of search criteria variant terms to identify a set of candidate search terms; and
  provide the set of candidate search terms for display on an interface of the user device.

2. The device of claim 1, where the one or more processors, when generating the set of search criteria variant terms, are to:
 determine a particular alias for a proper noun value of the set of proper noun values, and
 generate one or more search criteria variant terms, of the set of search criteria variant terms, for the particular alias for the proper noun value,
  the one or more search criteria variant terms including at least one of:
   one or more variations of a first name,
   one or more variations of a last name,
   one or more variations of a middle name or initial, or
   one or more variations of a nickname that is different than the first name, the last name, and/or the middle name or initial.

3. The device of claim 1, where the one or more processors, when generating the set of search criteria variant terms, are to:
 generate, for one or more proper noun values, of the set of proper noun values, another configurable template that is to be used to generate one or more search criteria variant terms, of the set of search criteria variant terms,
  the other configurable template to identify a group of proper noun values that share a common type of alias, and
 generate the one or more search criteria variant terms using the other configurable template.

4. The device of claim 1, where the one or more processors, when generating the set of search criteria variant terms, are to:
 generate, for one or more proper noun values, of the set of proper noun values, another configurable template that includes a language-specific naming convention that is to be used to generate one or more search criteria variant terms, of the set of search criteria variant terms, and
 generate the one or more search criteria variant terms using the other configurable template.

5. The device of claim 1, where the one or more processors, when generating the set of search criteria variant terms, are to:
generate, for one or more proper noun values, of the set of proper noun values, another configurable template that is to be used to generate one or more search criteria variant terms, of the set of search criteria variant terms, the other configurable template to identify a group of proper noun values that share a common type of alias,
generate the one or more search criteria variant terms using the configurable template and the other configurable template.

6. The device of claim 1, where the one or more processors, when identifying the set of proper noun values, are to:
provide, using an application programming interface (API), the location information as input to the natural language processing model,
the natural language processing model being supported by a server device,
the server device to use the natural language processing model to identify the set of proper noun values, and
the server device to provide the set of proper noun values to the device.

7. The device of claim 1, where the one or more processors, when processing the partial search criteria, are to:
use the partial search criteria to query a data structure that stores the set of search criteria variant terms, and
receive the set of candidate search terms as a result of the query.

8. A non-transitory computer-readable medium storing instructions, the instructions comprising:
one or more instructions that, when executed by one or more processors, cause the one or more processors to:
obtain location information associated with a set of locations,
the location information including a set of location name values for the set of locations;
identify, using a natural language processing model, a set of proper noun values associated with the set of location name values;
generate a set of search criteria variant terms for the set of proper noun values,
the set of search criteria variant terms each including one or more characters associated with an alias of a particular proper noun value of the set of proper noun values, and
where the one or more instructions, that cause the one or more processors to generate the set of search criteria variant terms, cause the one or more processors to:
generate, for one or more proper noun values of the set of proper noun values, a configurable template used to generate one or more search criteria variant terms of the set of search criteria variant terms,
the configurable template to identify a geographic area associated with the one or more proper noun values, and
generate the one or more search criteria variant terms using the configurable template;
receive, from a user device, partial search criteria relating to an alias of a destination location;
process the partial search criteria using the set of search criteria variant terms to identify a set of candidate search terms; and
provide the set of candidate search terms for display on an interface of the user device.

9. The non-transitory computer-readable medium of claim 8, where the one or more instructions, that cause the one or more processors generate the set of search criteria variant terms, cause the one or more processors to:
determine a particular alias for a proper noun value, of the set of proper noun values, by analyzing historical search information,
the historical search information including a threshold number of searches that searched for the particular alias, and
generate one or more search criteria variant terms, of the set of search criteria variant terms, for the particular alias for the proper noun value.

10. The non-transitory computer-readable medium of claim 8, where the one or more instructions, that cause the one or more processors to generate the set of search criteria variant terms, cause the one or more processors to:
generate, for one or more proper noun values, of the set of proper noun values, another configurable template that is to be used to generate one or more search criteria variant terms, of the set of search criteria variant terms,
where the one or more processors generate the other configurable template by analyzing historical search information to identify a group of proper noun values that share a common type of alias, and
generate the one or more search criteria variant terms using the other configurable template.

11. The non-transitory computer-readable medium of claim 8, where the one or more instructions, that cause the one or more processors to identify the set of proper noun values, cause the one or more processors to:
train the natural language processing model on historical location information, and
provide the location information as input to the natural language processing model to cause the natural language processing model identify the set of proper noun values,
where the natural language processing model uses a named-entity recognition (NER) technique to process the location information.

12. The non-transitory computer-readable medium of claim 8, where the one or more instructions, when executed by the one or more processors, further cause the one or more processors to:
receiving feedback information associated with a set of requests for navigational directions,
the feedback information indicating which candidate search terms were selected during each request, of the set of requests for navigational directions, and
modify one or more search criteria variant terms based on the feedback information.

13. The non-transitory computer-readable medium of claim 8, where the one or more instructions, that cause the one or more processors to generate the set of search criteria variant terms, cause the one or more processors to:
generate one or more search criteria variant terms, of the set of search criteria variant terms, for a particular alias for a proper noun value, of the set of proper noun values,
the one or more search criteria variant terms including at least one of:
one or more variations of a first name,
one or more variations of a last name,
one or more variations of a middle name or initial, or one or more variations of a nickname that is different than the first name, the last name, and/or the middle name or initial.

14. A method, comprising:
obtaining, by a device, location information associated with a set of locations,
    the location information including a set of location name values for the set of locations;
identifying, by the device and by using a natural language processing model, a set of proper noun values associated with the set of location name values;
generating, by the device, a set of search criteria variant terms for the set of proper noun values,
    the set of search criteria variant terms each including one or more characters associated with an alias of a particular proper noun value of the set of proper noun values, and
    where generating the set of search criteria variant terms comprises:
        generating, for one or more proper noun values of the set of proper noun values, a configurable template used to generate one or more search criteria variant terms of the set of search criteria variant terms,
            the configurable template to identify a geographic area associated with the one or more proper noun values, and
        generating the one or more search criteria variant terms using the configurable template;
receiving, by the device and from a user device, partial search criteria relating to an alias of a destination location;
processing, by the device, the partial search criteria using the set of search criteria variant terms to identify a set of candidate search terms; and
providing, by the device, the set of candidate search terms for display on an interface of the user device.

15. The method of claim 14, where generating the set of search criteria variant terms comprises:
generating one or more search criteria variant terms, of the set of search criteria variant terms, for a particular alias for a proper noun value, of the set of proper noun values,
    the one or more search criteria variant terms including at least one of:
        one or more variations of a first name,
        one or more variations of a last name,
        one or more variations of a middle name or initial, or
        one or more variations of a nickname that is different than the first name, the last name, and/or the middle name or initial.

16. The method of claim 14, where generating the set of search criteria variant terms comprises:
generating, for one or more proper noun values, of the set of proper noun values, another configurable template that is to be used to generate one or more search criteria variant terms, of the set of search criteria variant terms,
    the configurable template to identify a group of proper noun values that share a common type of alias, and
generating the one or more search criteria variant terms using the other configurable template.

17. The method of claim 14, where generating the set of search criteria variant terms comprises:
generating, for one or more proper noun values, of the set of proper noun values, another configurable template that includes a language-specific naming convention that is to be used to generate one or more search criteria variant terms, of the set of search criteria variant terms, and
generating the one or more search criteria variant terms using the other configurable template.

18. The method of claim 14, where generating the set of search criteria variant terms comprises:
generating, for one or more proper noun values, of the set of proper noun values, another configurable template that is to be used to generate one or more search criteria variant terms, of the set of search criteria variant terms,
    the other configurable template to identify a group of proper noun values that share a common type of alias,
and
generating the one or more search criteria variant terms using the configurable template and the other configurable template.

19. The method of claim 14, where identifying the set of proper noun values comprises:
training the natural language processing model on historical location information, and
providing the location information as input to the natural language processing model to cause the natural language processing model identify the set of proper noun values.

20. The method of claim 14, further comprising:
receiving feedback information associated with a set of requests for navigational directions,
    the feedback information indicating which candidate search terms were selected during each request, of the set of requests for navigational directions, and
modifying one or more search criteria variant terms based on the feedback information.

* * * * *